United States Patent
O'Malley et al.

(10) Patent No.: US 11,086,721 B2
(45) Date of Patent: *Aug. 10, 2021

(54) COGNITIVE ANALYSIS AND RESOLUTION OF ERRONEOUS SOFTWARE PATCHES

(71) Applicant: International Business Machines Corporation, Armonk, NY (US)

(72) Inventors: John O'Malley, Galway (IE); Michael Ryan, GalwayGalway (IE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/801,645

(22) Filed: Feb. 26, 2020

(65) Prior Publication Data

US 2020/0201715 A1 Jun. 25, 2020

Related U.S. Application Data

(63) Continuation of application No. 15/723,282, filed on Oct. 3, 2017, now Pat. No. 10,592,343.

(51) Int. Cl.
*G06F 11/00* (2006.01)
*G06F 11/14* (2006.01)
*G06F 8/65* (2018.01)

(52) U.S. Cl.
CPC ............ *G06F 11/1433* (2013.01); *G06F 8/65* (2013.01); *G06F 2201/805* (2013.01)

(58) Field of Classification Search
CPC .. G06F 11/0793; G06F 11/1433; G06F 11/34; G06F 11/3438
See application file for complete search history.

(56) References Cited

U.S. PATENT DOCUMENTS

| | | | |
|---|---|---|---|
| 7,496,913 B2 | 2/2009 | Hayes et al. |
| 8,381,036 B2 | 2/2013 | Vidal et al. |
| 8,381,208 B2 | 2/2013 | Burke et al. |
| 8,813,063 B2 | 8/2014 | Uthe |
| 8,972,963 B2 | 3/2015 | Baset et al. |
| 9,026,856 B2 | 5/2015 | Hecox et al. |
| 9,442,983 B2 | 9/2016 | Higginson et al. |
| 9,471,455 B2 | 10/2016 | Horn et al. |
| 9,984,329 B2 | 5/2018 | Winnick |

(Continued)

OTHER PUBLICATIONS

List of IBM Patents or Patent Applications Treated as Related, Dated Feb. 26, 2020, 2 pages. (Appendix P).

(Continued)

*Primary Examiner* — Elmira Mehrmanesh
(74) *Attorney, Agent, or Firm* — Yee & Associates, P.C.

(57) ABSTRACT

Resolving software patch issues is provided. Recorded activities performed by users to resolve an issue with a patch applied to an application on a group of client devices are compared. A set of common user activities are identified within the recorded activities performed by the users. A subset of highest ranking common user activities is selected from the set of common user activities. A fix for the issue with the patch is generated based on the subset of highest ranking common user activities. Corrective action based on the fix is taken to resolve the issue with the patch on a client device, the client device experiencing the issue resolved by users on the group of client devices.

17 Claims, 4 Drawing Sheets

(56) References Cited

U.S. PATENT DOCUMENTS

| | | |
|---|---|---|
| 10,198,415 B2 | 2/2019 | Mackin |
| 10,248,404 B2 | 4/2019 | Garman et al. |
| 10,268,561 B2 | 4/2019 | Bell et al. |
| 10,592,343 B2 * | 3/2020 | O'Malley ............ G06F 11/0793 |
| 2009/0210305 A1 | 8/2009 | Lyons |
| 2016/0070555 A1 | 3/2016 | Xiong et al. |
| 2016/0246591 A1 | 8/2016 | Eberlein et al. |
| 2016/0259638 A1 | 9/2016 | El et al. |
| 2017/0337560 A1 | 11/2017 | Wang et al. |
| 2018/0006904 A1 | 1/2018 | Arnold et al. |
| 2018/0131574 A1 | 5/2018 | Jacobs et al. |
| 2019/0026091 A1 | 1/2019 | Gao et al. |
| 2019/0102255 A1 | 4/2019 | O'Malley et al. |

OTHER PUBLICATIONS

O'Malley et al., "Automatic Patch Management", U.S. Appl. No. 15/472,695, filed Mar. 29, 2017, 45 pages.

Office Action, dated May 2, 2019, regarding U.S. Appl. No. 15/732,282, 12 pages.

Final Office Action, dated Sep. 16, 2019, regarding U.S. Appl. No. 15/732,282, 16 pages.

Notice of Allowance, dated Nov. 6, 2019, regarding U.S. Appl. No. 15/732,282, 5 pages.

* cited by examiner

COGNITIVE ANALYSIS AND RESOLUTION OF ERRONEOUS SOFTWARE PATCHES

BACKGROUND

1. Field

The disclosure relates generally to software patches and more specifically to using cognitive analysis of monitored user activity on a client device to detect and resolve issues with an application on the client device corresponding to a recently applied software patch.

2. Description of the Related Art

Currently, it is difficult to maintain performance of applications loaded on devices using patches. A patch is a piece of software designed to update an application or its supporting data to fix or improve the application. This includes fixing security vulnerabilities and improving the usability or performance of the application. Usability is the degree to which the application can be utilized by users to achieve objectives in a context of use. Performance is the amount of work accomplished by the application. Depending on the context, increased performance may include, for example, decreased response time, increased throughput, decreased utilization of device resources, increased availability, increased network bandwidth, decreased data transmission time, and the like.

The devices may include, for example, smart phones, personal digital assistants, handheld computers, laptop computers, desktop computers, server computers, and virtual machines, to illustrate the variety. In addition to the number and variety of these devices, the number and complexity of the applications that run on these devices has increased along with the challenge of managing and applying a wide variety of patches to these applications. Further, a faulty or erroneously applied patch may inadvertently cause issues, such as decreased application performance or crashing an application.

SUMMARY

According to one illustrative embodiment, a computer-implemented method for resolving software patch issues is provided. A computer compares recorded activities performed by users to resolve an issue with a patch applied to an application on a group of client devices. The computer identifies a set of common user activities within the recorded activities performed by the users. The computer selects a subset of highest ranking common user activities from the set of common user activities. The computer generates a fix for the issue with the patch based on the subset of highest ranking common user activities. The computer takes corrective action based on the fix to resolve the issue with the patch on a client device, the client device experiencing the issue resolved by users on the group of client devices. According to other illustrative embodiments, a computer system and computer program product for resolving software patch issues are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
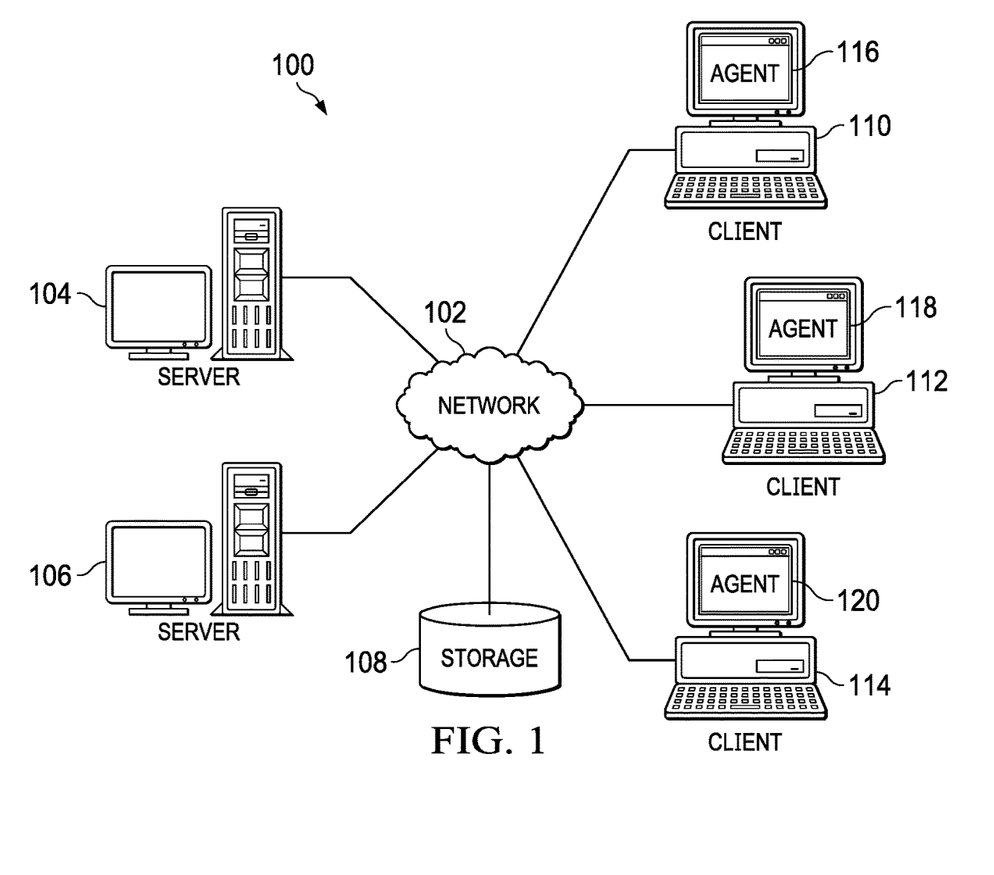
FIG. 1 is a pictorial representation of a network of data processing systems in which illustrative embodiments may be implemented.
Figure 2:
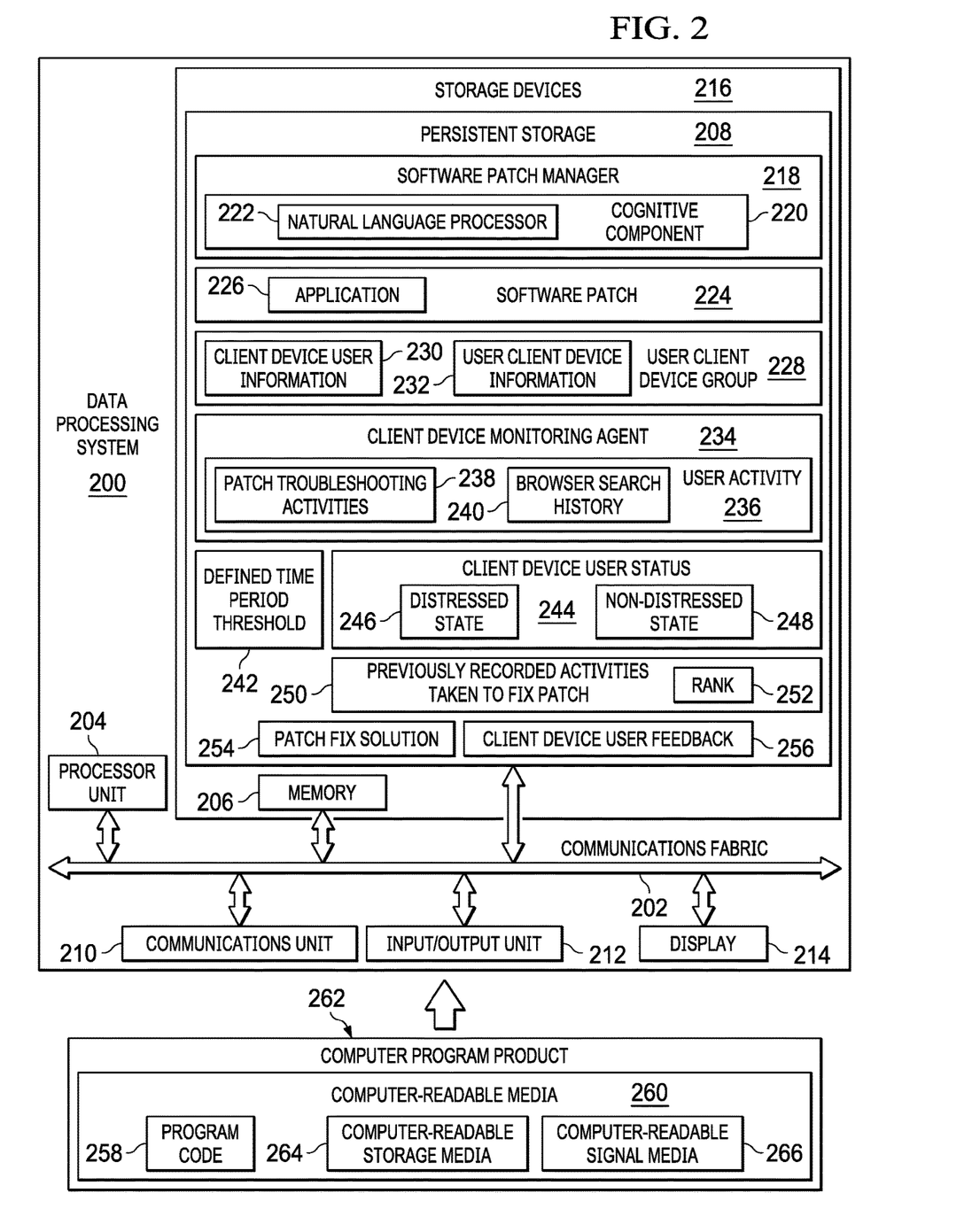
FIG. 2 is a diagram of a data processing system in which illustrative embodiments may be implemented.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services for fixing issues that arise from erroneous or faulty software patches being applied to applications running on client devices. An erroneous software patch may be a wrong or incorrect patch that was applied to an application in error. A faulty software patch is a patch that does not perform as intended (e.g., causes the application to crash or work at a lower performance level or has unintended consequences on a client device, which may require a user of the client device to take corrective action). Also, it should be noted that server 104 and server 106 may each represent a plurality of different servers providing a plurality of different software patch issue resolution services.

Client 110, client 112, and client 114 also connect to network 102. Clients 110, 112, and 114 are clients of server 104 and server 106. Further, server 104 and server 106 may provide information, such as, for example, operating systems, software applications, software patches, user activity monitoring agents, and the like, to clients 110, 112, and 114.

In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, personal digital assistants, gaming devices, kiosks, and the like, with wire or wireless communication links to network 102.

A user of client 110 may utilize client 110 to request, for example, a software patch from server 104 or server 106 to update or upgrade an application loaded on client 110. However, it should be noted that server 104 and server 106, using a software patch manager, may automatically send software patches to clients 110, 112, and 114 as new security patches or other critical patches become available for applications.

Also in this example, clients 110, 112, and 114 include agent 116, agent 118, and agent 120, respectively. Agents 116-120 are monitoring agents that monitor, collect, and record user activities on clients 110, 112, and 114. In addition, agents 116-120 are configured to identify troubleshooting activities performed by users on clients 110, 112, and 114 and determine whether the users are attempting to correct issues with applied software patches. Server 104 and/or server 106 may, for example, automatically embed agent 116, agent 118, and agent 120 in clients 110, 112, and 114, respectively.

Storage 108 is a network storage device capable of storing any type of data in a structured format or an unstructured format. In addition, storage 108 may represent a set of one or more network storage devices. Storage 108 may store, for example, names and identifiers for a plurality of different client devices; names and identifiers for a plurality of different applications loaded on the plurality of different client devices; a plurality of different software patches corresponding to different applications; a plurality of previously recorded activities taken to fix patches; patch fix solutions, client device user feedback regarding patch fixes; client device user activity monitoring agents; and the like. Further, storage 108 may store other data, such as authentication or credential data that may include user names, passwords, and biometric data associated with users and system administrators, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores software patch manager 218. Software patch manager 218 controls the process of providing fixes to issues arising from erroneous or faulty software patches being applied to applications running on client devices, such as clients 110-114 in FIG. 1. It should be noted that even though software patch manager 218 is illustrated as residing in persistent storage 208, in an alternative illustrative embodiment software patch manager 218 may be a separate component of data processing system 200. For example, software patch manager 218 may be a hardware component coupled to communication fabric 202 or a combination of hardware and software components. In another alternative illustrative embodiment, a first set of components of software patch manager 218 may be located in data processing system 200 and a second set of components of software patch manager 218 may be located in a client device.

In this example, software patch manager 218 includes cognitive component 220. However, it should be noted that software patch manager 218 may include more or fewer components than illustrated. Software patch manager 218 utilizes cognitive component 220 to analyze monitored user activity on the client device to detect and resolve issues with an application that had a software patch previously applied. Cognitive component 220 includes natural language processor 222. Cognitive component 220 utilizes natural language processor 222 to identify terms and phrases in the monitored user activity for analysis by cognitive component 220. Natural language processor 222 may utilize, for example, syntactic analysis, semantic analysis, and the like, to parse and identify terms and phrases in the monitored user activity logs. After natural language processor 222 identifies the terms and phrases in the monitored user activity logs, cognitive component 220 analyzes the identified terms and phrases and uses a machine learning multiclass classifier to learn activities and patterns of activities utilized by the client device users to resolve issues with patched applications running on each of their respective client devices. The multiclass classifier describes sets of instances that have common user activity features.

Software patch 224 represents a patch for updating or upgrading application 226. It should be noted that software patch 224 may represent a plurality of different software patches corresponding to a plurality of different applications. Software patch manager 218 may, for example, automatically send software patch 224 to client devices containing application 226.

User client device group 228 represents a listing of different groups of user client devices. Software patch manager 218 groups the different user client devices based on client device user information 230 and user client device information 232. Client device user information 230 represents information corresponding to the user of a particular client device. Client device user information 230 may include, for example, a history of how the user utilizes the particular client device on daily basis (i.e., normal daily user behavior). For example, how the user utilizes the client device during scheduled work hours (i.e., what applications are run and what tasks are performed by the user during these hours), during hours when not at work, and the like. It should be noted that the user may utilize a plurality of client devices on a daily basis and software patch manager 218 may place each of the plurality of client devices utilized by the user in different groups or the same group of client devices based on how the user utilizes each particular client device. User client device information 232 represents information corresponding to the client device, itself. User client device information 232 may include, for example, operating system and version, applications and versions, patches applied and reference numbers, patch issues, patch fixes, hardware specifications, and the like.

Client device monitoring agent 234 represents a listing of a plurality of monitoring agents residing on a plurality of different user client devices, along with their respective identifiers. Software patch manager 218 utilizes a monitoring agent to monitor and record user activity 236 on a respective client device. In particular, software patch manager 218 receives patch troubleshooting activities 238 from the monitoring agent after software patch 224 has been applied to application 226 on the client device. Patch troubleshooting activities 238 represent activities performed by the user of the client device to try and resolve one or more issues with application 226 after software patch 224 was applied. In addition, software patch manager 218 receives browser search history 240 from the monitoring agent. Browser search history 240 represents Internet search activity performed by the user of the client device trying to find information related to application 226, which may have been negatively affected by software patch 224.

Defined time period threshold 242 sets a limit on the amount of time after which software patch manager 218 will no longer consider user activity 236 as being caused by issues with software patch 224. Client device user status 244 represents a current state of the user of the client device. Client device user status 244 includes distressed state 246 and non-distressed state 248. Software patch manager 218 updates client device user status 244 to distressed state 246 when software patch manager 218 receives patch troubleshooting activities 238 from the monitoring agent within defined time period threshold 242. Software patch manager 218 updates client device user status 244 to non-distressed state 248 when software patch manager 218 receives an indication from the monitoring agent that the client device user has returned to normal daily activity after having been previously placed in distressed state 246.

Previously recorded activities taken to fix patch 250 represents steps taken by other users of other client devices to fix issues caused by applying software patch 224 to application 226. Software patch manager 218 may cross-reference the previously recorded activities to find common steps taken to fix the issues corresponding to software patch 224. Further, software patch manager 218 may list previously recorded activities taken to fix patch 250 by rank 252. Software patch manager 218 may rank the previously recorded activities takes to fix patch 250 based on the amount of time taken by the users to resolve the issues corresponding to software patch 224. In other words, software patch manager 218 may rank steps taken to fix the issues in the shortest amount of time higher than other steps taking longer to fix the issues.

Furthermore, software patch manager 218 may automatically generate patch fix solution 254 based on information contained in previously recorded activities taken to fix patch 250. Patch fix solution 254 represents a fix to software patch 224. In other words, patch fix solution 254 resolves the issues caused by applying software patch 224 to application 226. Moreover, software patch manager 218 may automatically apply patch fix solution 254 to client devices containing application 226. Software patch manager 218 also may request client device user feedback 256 from users after patch fix solution 254 has been applied to their corresponding client devices.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 258 is located in a functional form on computer readable media 260 that is selectively removable and may be loaded onto or transferred to data processing system 200 for running by processor unit 204. Program code 258 and computer readable media 260 form computer program product 262. In one example, computer readable media 260 may be computer readable storage media 264 or computer readable signal media 266. Computer readable storage media 264 may include, for example, an optical or magnetic disc that is inserted or placed into a drive or other device that is part of persistent storage 208 for transfer onto a storage device, such as a hard drive, that is part of persistent storage 208. Computer readable storage media 264 also may take the form of a persistent storage, such as a hard drive, a thumb drive, or a flash memory that is connected to data processing system 200. In some instances, computer readable storage media 264 may not be removable from data processing system 200.

Alternatively, program code 258 may be transferred to data processing system 200 using computer readable signal media 266. Computer readable signal media 266 may be, for example, a propagated data signal containing program code 258. For example, computer readable signal media 266 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 258 may be downloaded over a network to persistent storage 208 from another device or data processing system through computer readable signal media 266 for use within data processing system 200. For instance, program code stored in a computer readable storage media in a data processing system may be downloaded over a network from the data processing system to data processing system 200. The data processing system providing program code 258 may be a server computer, a client computer, or some other device capable of storing and transmitting program code 258.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 264 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that current technology does not have the ability to automatically detect user dissatisfaction with a software patch and then apply patch fixes. Illustrative embodiments are able to determine whether an applied software patch is decreasing performance of a client device, generate a fix for the applied patch, and then automatically push the fix for the applied patch to the client device. Illustrative embodiments are able to do this by continually monitoring user interaction with a client device. Illustrative embodiments run a monitoring agent on client devices to monitor and record the user activities on the client devices.

After a patch is applied, a user typically continues to perform normal daily activities, such as, for example, work-related activities, on the client device. If the user starts performing troubleshooting activities on the client device within a predefined period of time of when the patch was applied, then illustrative embodiments may determine that the client device user is in a state of distress and update a status of the user to reflect this distressed state. Illustrative embodiments may keep the status of the client device user as distressed until illustrative embodiments are able to determine that the client device user has returned to normal activities and is no longer performing troubleshooting activities corresponding to the problem.

Illustrative embodiments place different client device users into different user groups based on how users utilize their respective client devices (e.g., performing work-related tasks on a daily basis) and the configuration of their respective client devices (e.g., type of device, applications loaded on the device, and the like). Consequently, illustrative embodiments are able to determine when a particular user is utilizing a client device in a different manner as compared to other client device users in the same group. In addition, illustrative embodiments are able to determine when a particular user is utilizing a client device in a typical manner or an atypical manner based on stored historical behavior corresponding to that particular user.

For example, illustrative embodiments may identify certain typical user activities as not corresponding to an issue with the patch based on the stored historical user behavior. User activities not related to an issue with the patch may include, for example, using the application corresponding to the patch for extended periods of time during the day, performing normal tasks throughout the day using the application, and the like. Illustrative embodiments also may identify certain atypical user activities as corresponding to an issue with the patch. These atypical user activities corresponding to an issue with the patch may be potential troubleshooting activities, such as, for example, the user going to system directories that illustrative embodiments have no record of the user going to previously, the user activating system monitoring tools, the user checking registry settings, the user making application configuration changes, the user performing application debugging, and the like. In addition, illustrative embodiments may identify the user utilizing a browser on the client device to search for information related to an application on the client device that may be affected by an applied patch as a troubleshooting activity as well. Further, illustrative embodiments may monitor application usage and duration of application usage after a patch is applied to determine whether the user is experiencing difficulties from the change. For example, if the user immediately stops using an application that the user typically utilizes all day at work or only uses the application for a short period of time after a patch was applied, then illustrative embodiments may determine that the patch created a problem.

After illustrative embodiments determine that a user is in a distressed state, illustrative embodiments record the identified troubleshooting activities at a predetermined threshold level of activity on the client device. In other words, illustrative embodiments generate a record of user movement within the client device, which is a sequential record of moves made by the user's inputs. For example, a user movement record may include: 1) open start menu; 2) open control panel; 3) delete a program; 4) open browser; 5) go to c:/; 6) go to programs and features; and so on.

Illustrative embodiments continue to identify a client device user as in a distressed state until the user returns to normal or regular activity on the client device based on a recorded history of user behavior corresponding to that particular user. Illustrative embodiments may determine whether the client device user is performing normal daily activities by comparing current user activities to the recorded history of user behavior. Immediately after the client device user returns to normal activity, illustrative embodiments may place the user in a state of possible distress for a set period of time. During that set period of time, if the client device user starts performing troubleshooting activities once again, then illustrative embodiments may determine that the client device user never left the distressed state.

After illustrative embodiments determine that the client device user is no longer in the distressed state, illustrative embodiments may send a popup textbox to the user and request that the user provide feedback on how the client device user fixed the applied patch issue. Upon receiving feedback from the client device user, illustrative embodiments may attach to the feedback information corresponding to the client device, such as, for example, operating system and application version affected by the applied patch. Because software patches are applied to applications on a multitude, possibly tens of thousands, of client devices, illustrative embodiments are able to receive and identify common troubleshooting activities performed by a plurality of client device users that were previously in distress and are no longer in distress (i.e., fixed the issue with the applied patch).

As a result, when a client device user goes into a distressed state after a software patch is applied, illustrative embodiments are able to send the user a popup textbox stating, "Have you tried this fix?", which is based on previously recorded user activities taken to fix the issue with the patch. Illustrative embodiments may rank fixes based on user client devices that are the same or similar to the user client device currently experiencing the issue. For example, illustrative embodiments may send the client device user a list of common steps that multiple other client device users have used to fix the issue with the patch on same or similar devices. Illustrative embodiments also may send the client device user a list of browser searches performed by other users in similar distress. This may provide a context to the issue the distressed user is experiencing.

After a client device user is out of distress, illustrative embodiments may measure the time it took for the client device user to get out of distress. Consequently, illustrative embodiments may send fix instructions to a newly distressed user that will bring the client device user out of distress the fastest (i.e., in the shortest amount of time). Overtime, illustrative embodiments using a cognitive component learn the best patch fixes that are able to bring a large percentage of client device users out of distress in the shortest amount of time possible. Further, illustrative embodiments may be able to push these best fixes to other client devices before patch issues arise. Furthermore, illustrative embodiments may automatically generate a patch fix based on the previously recorded user activities taken to fix a patch and then automatically apply the generated patch fix to client devices having the patch previously applied. As a result, illustrative embodiments are able to increase performance of client devices that are experiencing issues by resolving the issues caused by previously applied patches.

Figure 3A:
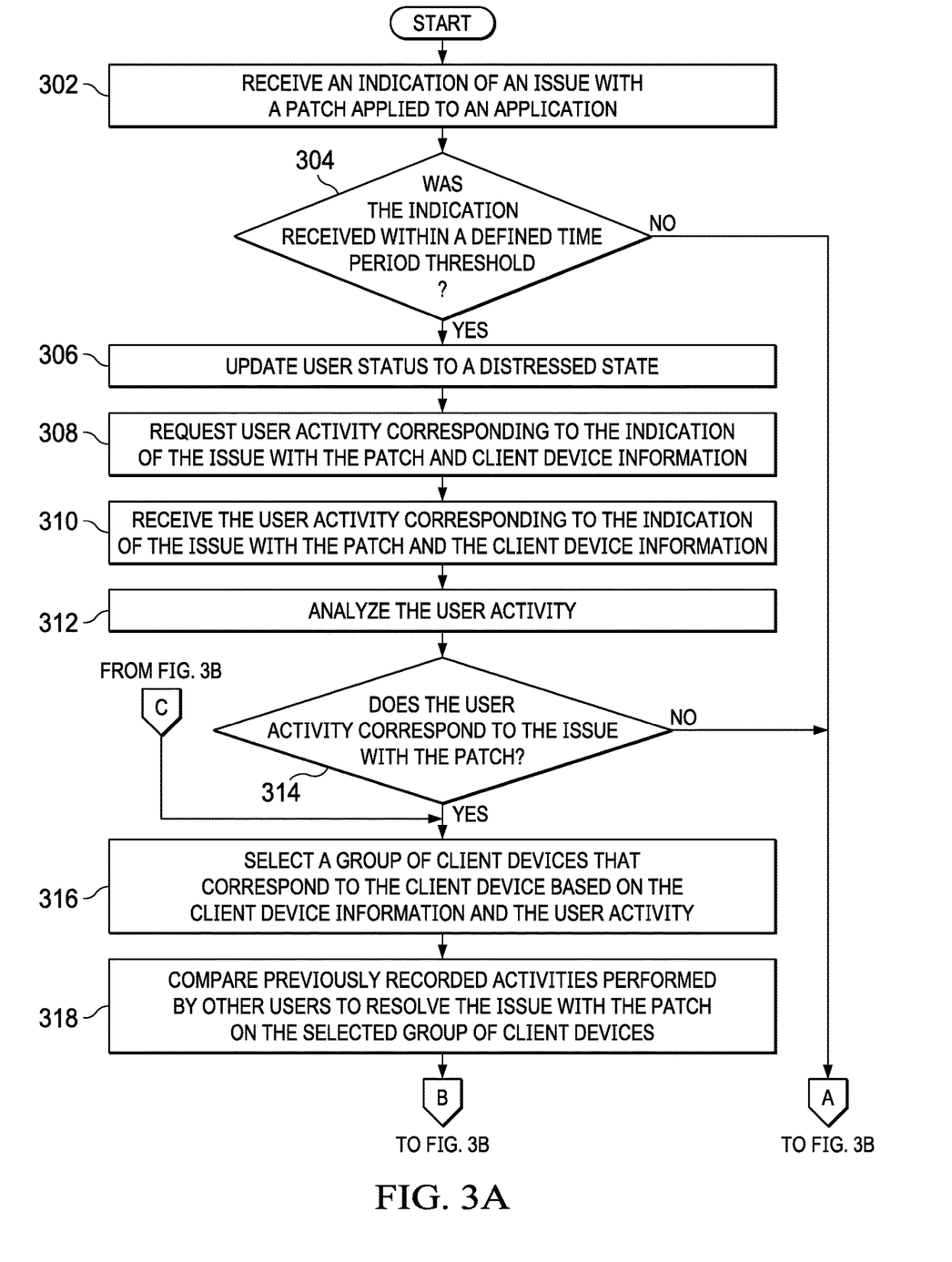
FIGS. 3A-3B are a flowchart illustrating a process for resolving software patch issues in accordance with an illustrative embodiment.
Figure 3B:
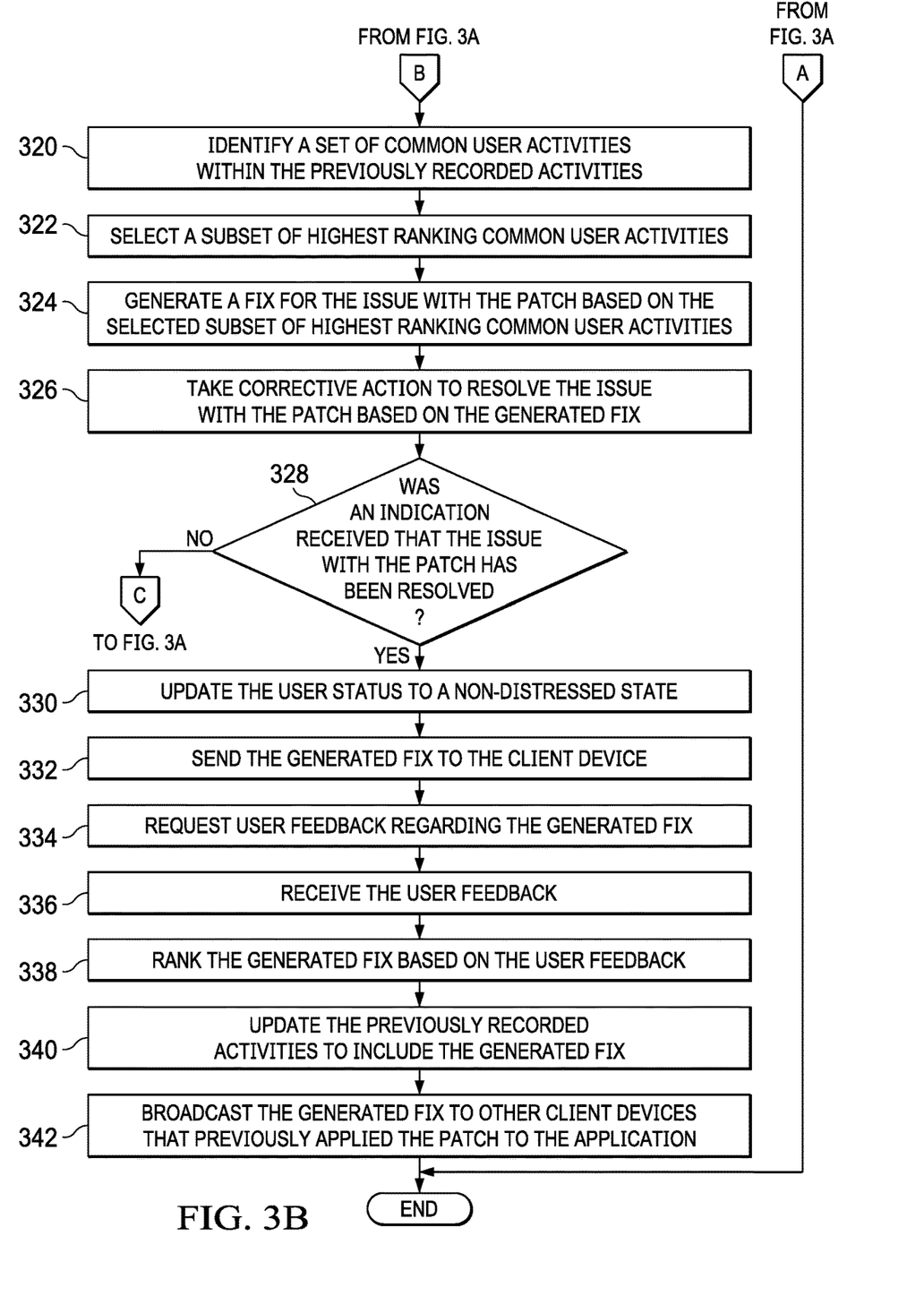

With reference now to FIGS. 3A-3B, a flowchart illustrating a process for resolving software patch issues is shown in accordance with an illustrative embodiment. The process shown in FIGS. 3A-3B may be implemented in a computer, such as, for example, server 104 in FIG. 1 or data processing system 200 in FIG. 2.

The process begins when the computer receives, from a monitoring agent running on a client device, an indication of an issue with a patch applied to an application based on user activity on the client device corresponding to the application (step 302). The monitoring agent running on the client device may be, for example, agent 116 running on client 110 in FIG. 1. The issue may have caused a decrease in performance of the client device, for example. The patch applied to the application may be, for example, software patch 224 applied to application 226 in FIG. 2. The monitored user activities indicating an issue with the patch may be, for example, the user performing troubleshooting activities, such as going to system directories not typically used by the user based on stored historical user behavior, activating monitoring tools on the client device, checking registry settings, using a browser on the client device to search for information corresponding to the application the patch was applied to, and the like. Other user activities indicating an issue with the patch may include, for example, the user trying the repeatedly restart the application after consecutive crashes during a short period of time, the user unable to restart the application at all, or the user taking longer to perform tasks using the application based on the stored historical user behavior. User activities not indicating an issue with the patch may include, for example, using the application for an entire work day and performing normal work-related tasks throughout the day using the application based on the stored historical user behavior.

After receiving the indication of the issue with the patch in step 302, the computer makes a determination as to whether the computer received the indication of the issue with the patch within a defined time period threshold corresponding to the patch (step 304). The defined time period threshold may be set by a system administrator, for example. The defined time period threshold may be, for example, one hour, one day, one week, one month, or any other defined period of time. If the computer determines that the indication of the issue with the patch was not received within the defined time period threshold corresponding to the patch, no output of step 304, then the process terminates thereafter.

If the computer determines that the indication of the issue with the patch was received within the defined time period threshold corresponding to the patch, yes output of step 304, then the computer updates a status of a user of the client device to a distressed state (step 306). The distressed state may be, for example, distressed state 246 in FIG. 2. In addition, the computer requests the user activity corresponding to the indication of the issue with the patch and client device information from the monitoring agent (step 308). The user activity may be, for example, user activity 236 in FIG. 2. The client device information may be, for example, user client device information 232 in FIG. 2.

Subsequently, the computer receives the user activity corresponding to the indication of the issue with the patch and the client device information from the monitoring agent (step 310). Further, the computer analyzes the user activity using natural language processing and a cognitive component (step 312). The computer may utilize a natural language processor and a cognitive component, such as natural language processor 222 and cognitive component 220 in FIG. 2, to perform the natural language processing and cognitive analysis of the user activity. The cognitive component analyzes the user activity based on the natural language processing, which identifies terms and phrases in the user activity using syntactic analysis and semantic analysis, for example. Furthermore, the computer makes a determination as to whether the user activity corresponds to the issue with the patch based on the analysis (step 314). The computer utilizes machine learning of the cognitive component to identify the user activities corresponding to the issues with the patch, such as, for example, the user performing troubleshooting activities.

If the computer determines that the user activity does not correspond to the issue with the patch based on the analysis, no output of step 314, then the process terminates thereafter. If the computer determines that the user activity does correspond to the issue with the patch based on the analysis, yes output of step 314, then the computer selects a group of client devices that correspond to the client device based on the client device information and the user activity (step 316). The selected group of client devices may be, for example, user client device group 228 in FIG. 2.

Moreover, the computer compares previously recorded activities performed by other users to resolve the issue with the patch on the selected group of client devices (step 318). The previously recorded activities performed by the other users may be, for example, previously recorded activities taken to fix patch 250 in FIG. 2. Afterward, the computer identifies a set of common user activities within the previously recorded activities performed by the other users (step 320). Then, the computer selects a subset of highest ranking common user activities from the set (step 322). The computer selects the subset of highest ranking common user activities based on rank, such as rank 252 in FIG. 2.

The computer generates a fix for the issue with the patch based on the selected subset of highest ranking common user activities (step 324). The computer also takes corrective action to resolve the issue with the patch on the client device based on the generated fix (step 326). Resolving the issue with the patch may increase performance of the client device. Subsequently, the computer makes a determination as to whether the computer received an indication from the monitoring agent on the client device that the issue with the patch has been resolved based on current user activity on the client device (step 328).

If the computer determines that an indication was not received from the monitoring agent on the client device indicating that the issue with the patch was resolved based on the current user activity on the client device, no output of step 328, then the process returns to step 316 where the computer selects another group of client devices. Alternatively, the process may proceed to step 332. If the computer determines that an indication was received from the monitoring agent on the client device indicating that the issue with the patch was resolved based on the current user activity on the client device, yes output of step 328, then the computer updates the status of the user of the client device to a non-distressed state (step 330). The non-distressed state may be, for example, non-distressed state 248 in FIG. 2.

In addition, the computer sends the generated fix to the client device for review by the user (step 332). Further, the computer requests feedback from the user regarding the generated fix and time to resolve the issue with the patch (step 334). Subsequently, the computer receives the feedback from the user (step 336). Furthermore, the computer ranks the generated fix based on the feedback and the time to resolve the issue with the patch (step 338). Moreover, the computer updates the previously recorded activities to include the generated fix (step 340). The computer also broadcasts the generated fix to other client devices that previously applied the patch to the application (step 342). The process terminates thereafter.

Thus, illustrative embodiments of the present invention provide a computer-implemented method, computer system, and computer program product for using cognitive analysis of monitored user activity on a client device to detect and resolve issues with an application on the client device corresponding to a recently applied software patch. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for resolving software patch issues, the computer-implemented method comprising:
    comparing, by a computer, recorded activities performed by users to resolve an issue with a patch applied to an application on a group of client devices;
    identifying, by the computer, a set of common user activities within the recorded activities performed by the users;
    selecting, by the computer, a subset of highest ranking common user activities from the set of common user activities;
    generating, by the computer, a fix for the issue with the patch based on the subset of highest ranking common user activities;
    taking, by the computer, corrective action based on the fix to resolve the issue with the patch on a client device, the client device experiencing the issue resolved by users on the group of client devices; and
    receiving, by the computer, an indication of the issue with the patch from a monitoring agent running on the client device based on user activity recorded by the monitoring agent corresponding to the application, wherein the issue caused a decrease in performance of the client device.

2. The computer-implemented method of claim 1 further comprising:
    determining, by the computer, whether the indication of the issue with the patch was received within a defined time period threshold corresponding to the patch; and
    responsive to the computer determining that the indication of the issue with the patch was received within the defined time period threshold corresponding to the patch, updating, by the computer, a status of a user of the client device to a distressed state.

3. The computer-implemented method of claim 1 further comprising:

requesting, by the computer, the user activity corresponding to the indication of the issue with the patch and client device information from the monitoring agent;
receiving, by the computer, the user activity corresponding to the indication of the issue with the patch and the client device information from the monitoring agent; and
analyzing, by the computer, the user activity corresponding to the indication of the issue with the patch using natural language processing, wherein the user activity is a user of the client device performing troubleshooting activities using the client device.

4. The computer-implemented method of claim 3 further comprising:
determining, by the computer, whether the user activity corresponds to the issue with the patch based on the analyzing; and
responsive to the computer determining that the user activity does correspond to the issue with the patch based on the analyzing, selecting, by the computer, the group of client devices that correspond to the client device based on the client device information and the user activity.

5. The computer-implemented method of claim 1 further comprising:
determining, by the computer, whether an indication was received from the monitoring agent on the client device indicating that the issue with the patch has been resolved based on current user activity on the client device; and
responsive to the computer determining that the indication was received from the monitoring agent on the client device indicating that the issue with the patch was resolved based on the current user activity on the client device, updating, by the computer, a status of the user of the client device to a non-distressed state from a distressed state.

6. The computer-implemented method of claim 1 further comprising:
selecting, by the computer, the group of client devices based on the client device and the user activity;
sending, by the computer, the fix to the client device corresponding to the group of client devices; and
requesting, by the computer, feedback from a user of the client device regarding the fix and time to resolve the issue with the patch.

7. The computer-implemented method of claim 6 further comprising:
ranking, by the computer, the fix based on the feedback and the time to resolve the issue with the patch.

8. The computer-implemented method of claim 1 further comprising:
broadcasting, by the computer, the fix to other client devices that had the patch applied to the application.

9. A computer system for resolving software patch issues, the computer system comprising:
a bus system;
a storage device connected to the bus system, wherein the storage device stores program instructions; and
a processor connected to the bus system, wherein the processor executes the program instructions to:
compare recorded activities performed by users to resolve an issue with a patch applied to an application on a group of client devices;
identify a set of common user activities within the recorded activities performed by the users;
select a subset of highest ranking common user activities from the set of common user activities;
generate a fix for the issue with the patch based on the subset of highest ranking common user activities;
take corrective action based on the fix to resolve the issue with the patch on a client device, the client device experiencing the issue resolved by users on the group of client devices and
receive an indication of the issue with the patch from a monitoring agent running on the client device based on user activity recorded by the monitoring agent corresponding to the application, wherein the issue caused a decrease in performance of the client device.

10. A computer program product for resolving software patch issues, the computer program product comprising a computer readable storage medium having program instructions embodied therewith, the program instructions executable by a computer to cause the computer to perform a method comprising:
comparing, by the computer, recorded activities performed by users to resolve an issue with a patch applied to an application on a group of client devices;
identifying, by the computer, a set of common user activities within the recorded activities performed by the users;
selecting, by the computer, a subset of highest ranking common user activities from the set of common user activities;
generating, by the computer, a fix for the issue with the patch based on the subset of highest ranking common user activities;
taking, by the computer, corrective action based on the fix to resolve the issue with the patch on a client device, the client device experiencing the issue resolved by users on the group of client devices; and
receiving, by the computer, an indication of the issue with the patch from a monitoring agent running on the client device based on user activity recorded by the monitoring agent corresponding to the application, wherein the issue caused a decrease in performance of the client device.

11. The computer program product of claim 10 further comprising:
determining, by the computer, whether the indication of the issue with the patch was received within a defined time period threshold corresponding to the patch; and
responsive to the computer determining that the indication of the issue with the patch was received within the defined time period threshold corresponding to the patch, updating, by the computer, a status of a user of the client device to a distressed state.

12. The computer program product of claim 10 further comprising:
requesting, by the computer, the user activity corresponding to the indication of the issue with the patch and client device information from the monitoring agent;
receiving, by the computer, the user activity corresponding to the indication of the issue with the patch and the client device information from the monitoring agent; and
analyzing, by the computer, the user activity corresponding to the indication of the issue with the patch using natural language processing, wherein the user activity is a user of the client device performing troubleshooting activities using the client device.

13. The computer program product of claim 12 further comprising:

determining, by the computer, whether the user activity corresponds to the issue with the patch based on the analyzing; and responsive to the computer determining that the user activity does correspond to the issue with the patch based on the analyzing, selecting, by the computer, the group of client devices that correspond to the client device based on the client device information and the user activity.

14. The computer program product of claim 10 further comprising:

determining, by the computer, whether an indication was received from the monitoring agent on the client device indicating that the issue with the patch has been resolved based on current user activity on the client device; and responsive to the computer determining that the indication was received from the monitoring agent on the client device indicating that the issue with the patch was resolved based on the current user activity on the client device, updating, by the computer, a status of the user of the client device to a non-distressed state from a distressed state.

15. The computer program product of claim 10 further comprising:

selecting, by the computer, the group of client devices based on the client device and the user activity;

sending, by the computer, the fix to the client device corresponding to the group of client devices; and requesting, by the computer, feedback from a user of the client device regarding the fix and time to resolve the issue with the patch.

16. The computer program product of claim 15 further comprising:

ranking, by the computer, the fix based on the feedback and the time to resolve the issue with the patch.

17. The computer program product of claim 10 further comprising:

broadcasting, by the computer, the fix to other client devices that had the patch applied to the application.

\* \* \* \* \*